United States Patent [19]

Berg

[11] Patent Number: 5,388,949
[45] Date of Patent: Feb. 14, 1995

[54] VEHICLE RETRIEVER/TRANSPORTER

[76] Inventor: Kenneth G. Berg, Box 411, Rte. 2, Mazeppa, Minn. 55956

[21] Appl. No.: 89,475

[22] Filed: Jul. 12, 1993

[51] Int. Cl.⁶ ................................................ B60P 1/16
[52] U.S. Cl. .................................. 414/480; 280/405.1; 280/765.1; 414/494; 414/537
[58] Field of Search .............................. 414/476–480, 414/469, 563, 483, 494, 537–540, 559; 280/402, 765.1, 405.1, 764.1

[56] References Cited

U.S. PATENT DOCUMENTS

| | | | |
|---|---|---|---|
| 2,587,265 | 2/1952 | Wright | 414/537 |
| 3,310,181 | 3/1967 | Symmank | 280/764.1 |
| 3,460,696 | 8/1969 | Owen, Jr. | 414/483 |
| 3,613,919 | 10/1971 | Creepo et al. | 414/494 |
| 3,675,800 | 7/1972 | Weyant et al. | 414/494 |
| 3,866,771 | 2/1975 | Reid et al. | 414/537 |
| 3,877,591 | 4/1975 | Howard | 414/563 |
| 4,020,957 | 5/1977 | Wren | 414/537 |
| 4,236,643 | 12/1980 | Schmitz | 280/764.1 X |
| 4,249,851 | 2/1981 | Sedelmayer | 414/480 X |

FOREIGN PATENT DOCUMENTS

| | | | |
|---|---|---|---|
| 2372050 | 7/1978 | France | 414/477 |
| 129848 | 4/1992 | Japan | 414/480 |
| 1627433 | 2/1991 | U.S.S.R. | 280/765.1 |

Primary Examiner—David A. Bucci
Attorney, Agent, or Firm—William J. Ryan

[57] ABSTRACT

A vehicle for retrieving and transporting disabled vehicles is provided having a wheeled frame and a cab containing an operator's compartment comprising an inclined vehicle transporting bed positioned behind said cab, said bed having a downwardly and rearwardly inclined fixed bed portion and a foldable bed portion hinged at its front edge to the rear edge of the fixed bed portion, the foldable bed portion being operable between a folded position wherein the foldable bed portion overlies the fixed bed portion and an unfolded position wherein the foldable bed portion is coplanar with the fixed bed portion. A stabilizing mechanism is also provided for stabilizing the retriever/transporter while extricating a disabled vehicle from an off-road location such as a ditch or snowbank in conjunction with a detachable boom in combination with a conventional winch and cable.

4 Claims, 3 Drawing Sheets

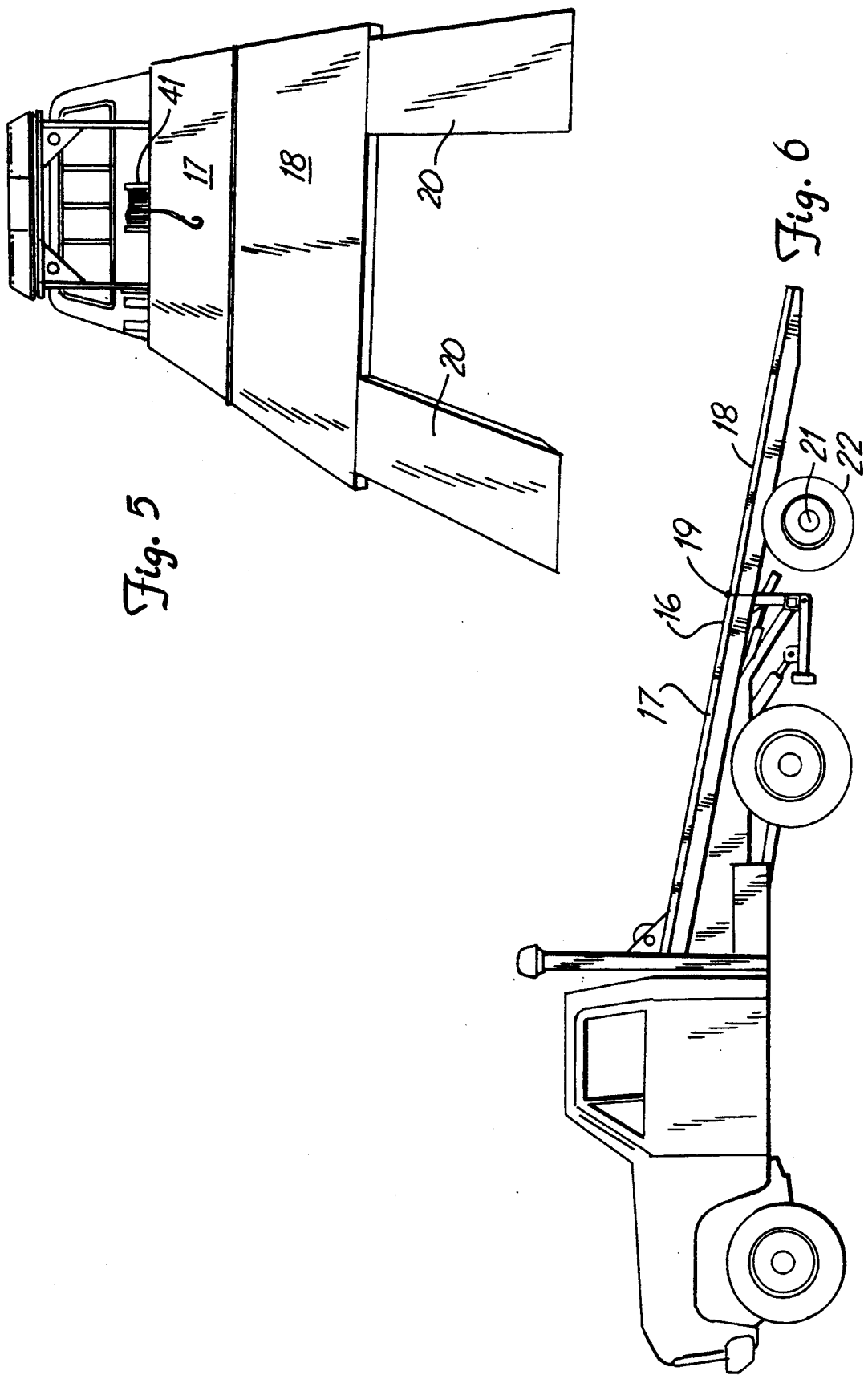

VEHICLE RETRIEVER/TRANSPORTER

BACKGROUND OF THE INVENTION

1. Field of the Invention

The present invention relates to a powered wheeled vehicle for retrieving and transporting other, typically disabled, vehicles. Such retrieving/transporting vehicles are generally used in motor vehicle repair to retrieve a vehicle that has been disabled and is incapable of operation on its own and to transport that vehicle to a location where it can be repaired.

2. Description of the Prior Art

The best known prior art is the common "wrecker" or tow truck which consists of a truck cab on a wheeled frame having a platform behind the cab. A boom (typically hydraulically operated) is fixed to and supported upon the platform and used to raise one end of the disabled vehicle for transport by means of a cable, chain or other suitable attachment to the frame of the disabled vehicle at the appropriate point. The cable or chain is operated by a winch or other suitable means. In operation, one end of the towed vehicle is lifted off the ground and the vehicle is towed on its remaining wheels.

Other devices have also been developed to do similar work. One such device is shown in U.S. Pat. No. 3,257,020 and is referred to as a "rollback." In this device, the truck bed elevates and tilts while moving generally rearwardly. When the rear of the bed is near the ground, the disabled vehicle is rolled on to the bed which is then tilted back and drawn forward to a generally horizontal position for transport.

Another alternative prior art device is shown in U.S. Pat. No. 2,662,655. This patent discloses a self-loading trailer that utilizes two hinged sections each comprising a pair of spaced channels in which the wheels of the disabled vehicle may be received. To load the disabled vehicle onto the trailer, the front end of the trailer must be elevated until its rear end reaches the ground.

The common wreckers or towing-type devices present some problems in operation in that one set of the wheels of the disabled vehicle will rest upon the ground. This causes possible instability or swaying during towing. The trailer-type devices eliminate this problem to some extent and thus have advantages over towing-type transporters. The trailer-type transporters lack the versatility of the towing-type transporter, however, in extricating or retrieving the disabled vehicles from situations from which it cannot be loaded onto the transporting vehicle (such as from ditches, snow banks or other off-road locations). In addition, such trailer-type transporters generally require a towing vehicle and a trailer of sufficient length to receive the disabled vehicle, rendering the entire configuration quite long and cumbersome.

SUMMARY OF THE INVENTION

It is one object of the present invention to provide a vehicle capable of retrieving disabled vehicles from locations off the roadway or other inaccessible locations and transporting such disabled vehicle without any portion thereof being in contact with the roadway or ground surface.

The present invention comprises a vehicle retriever/transporter having a wheeled truck frame upon which is mounted an engine in a cab in the conventional manner. A vehicle supporting platform or bed is positioned on the frame behind the cab. The bed is inclined downwardly and rearwardly from the horizontal and consists of a forward, fixed portion and a rearward, foldable portion. The foldable portion is attached to the fixed portion by means of a hinge. The foldable portion is operable between an unfolded position wherein it is essentially coplanar with the fixed portion, and a folded position wherein it overlays the top of the fixed portion, thereby considerably shortening the overall length of the retriever/transporter. The underside of the foldable portion of the bed carries an axle with a wheel attached at each of its ends. When the foldable portion is in the unfolded position, the bogie wheels support the rear portion of the bed during transport of the disabled vehicle. When not in use, the bed can be folded such that the foldable portion overlies the fixed portion of the bed.

The present invention also provides for a stabilizer secured to the underside of the fixed bed portion. The stabilizer is hydraulically operable between a retracted position and an extended position. When placed in the extended position, the stabilizer engages the roadway or ground surface and acts to support the rear of the retriever/transporter when extricating a disabled vehicle from a ditch or other off-road predicament. A detachable boom is provided which is received within a collar attached to the underside of the foldable bed portion when it is in the Folded position. The boom operates in conjunction with a cable secured to a winch attached behind the cab to retrieve the disabled vehicle from such predicament. When the stabilizer is placed in the retracted position, the retriever/transporter can be driven upon the roadway in the normal fashion.

DESCRIPTION OF THE DRAWING

FIG. 5 is a rear elevational view showing the bed in the unfolded position with loading ramps in place.

FIG. 6 is a side elevational view of the retriever/transporter according to the present invention showing the bed in its unfolded position.

DETAILED DESCRIPTION OF THE PREFERRED EMBODIMENT

Figure 1:
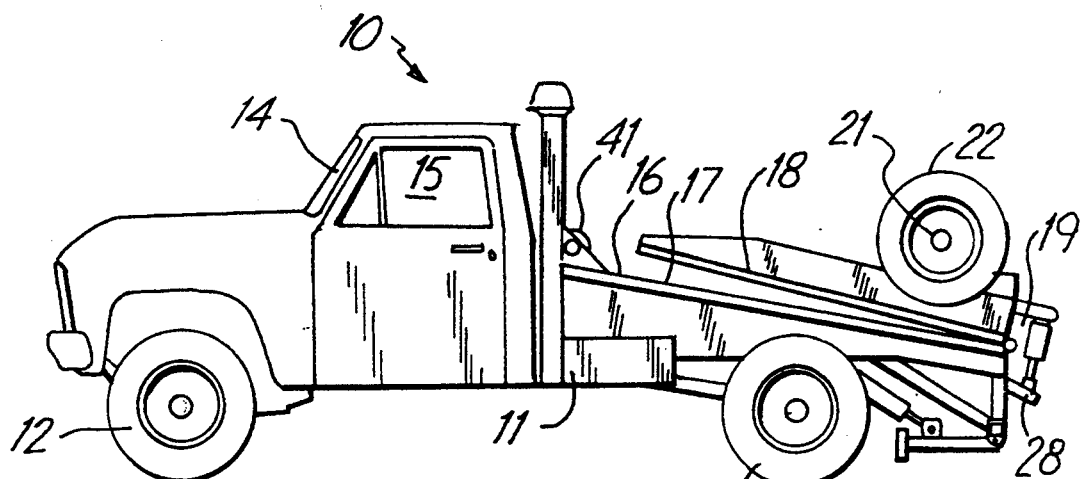
FIG. 1 is a side elevational view of a vehicle retriever/transporter according to the present invention wherein the vehicle transport bed is in its folded position.

Referring to the drawing, wherein like numerals represent like elements throughout the several views, there is provided a vehicle retriever/transporter generally designated by the numeral 10. The vehicle retriever/transporter 10 generally comprises a conventional truck frame 11 supported upon two wheeled axles 12, 13. The frame 11 carries a conventional cab 14 housing a motor (not shown) and an operator/passenger compartment 15, and a vehicle transport bed or platform 16 positioned rearwardly of the cab 14.

The bed 16 comprises a forward, fixed portion 17 positioned immediately behind the cab 14, and a rear, foldable portion 18. The fixed portion 17 is inclined from the horizontal and slopes rearwardly and downwardly along the frame 11. The front end of the foldable portion 18 is attached to the rear end of the fixed portion 17 by a hinge 19. The foldable portion 18 is operable between an unfolded position as seen in FIG. 6, wherein the foldable portion 18 is essentially coplanar with the fixed portion 17 to form a vehicle carrying platform 16. In the unfolded position, the rear edge of the foldable portion 18 is positioned in proximity to the ground as shown to facilitate the loading of a vehicle to be transported by means of ramps 20 detachably fixed to the rear of the foldable portion 18. In the folded position as seen in FIG. 1, the foldable portion 18 is rotated into overlying relation with the fixed portion 17 thereby considerably shortening the total length of the retriever/transporter 10 when it is not carrying a disabled vehicle.

The underside of the foldable portion 18 carries a wheeled axle 21 supporting a wheel 22 mounted at each end. When the foldable portion 18 is in the unfolded position, the axle 21 and wheels 22 serve to support it during the loading and transporting of a disabled vehicle.

The portions 17, 18 comprise a parallel, spaced longitudinally extending beams 23 and decks 24, 25 supported on the beams 23.

Figure 2:
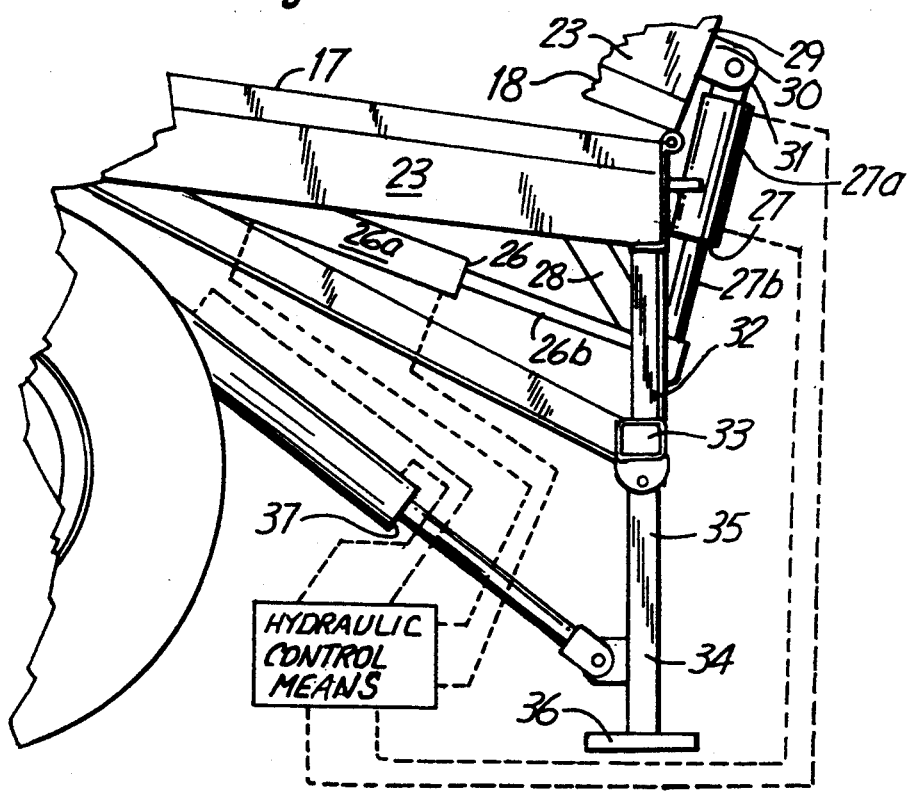
FIG. 2 is a fragmentary side elevational view of a portion of the present invention illustrating the mechanism by which the foldable bed portion of the present invention is operated between the folded and unfolded positions and the stabilizing mechanism for the present invention.
Figure 4:
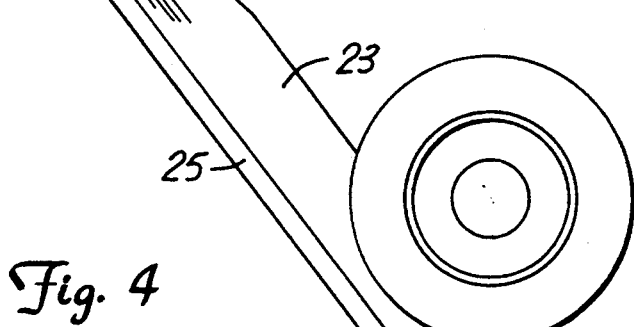
FIG. 4 is another fragmentary side elevational view showing the mechanism for operating the foldable bed portion between the folded and unfolded positions and further showing the stabilizing mechanism in its retracted position.
Figure 4:
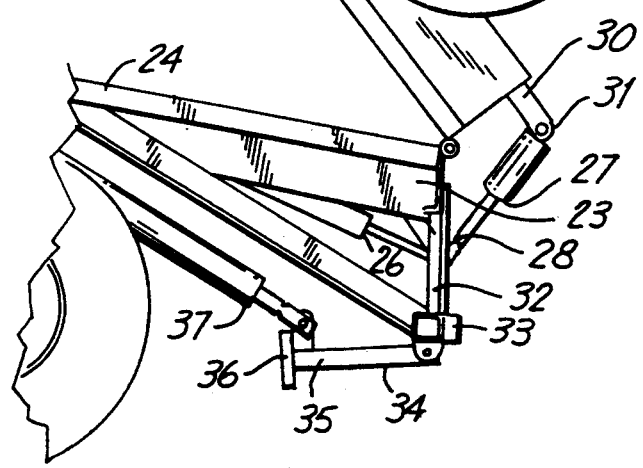

The mechanism for operating the rear bed portion 18 between the folded and unfolded positions is best seen in FIGS. 2 and 4. As shown, there is provided a pair of hydraulic cylinder/piston combinations 26, 27 consisting of conventional hydraulic cylinders 26a, 27a and associated piston rods 26b, 27b. Cylinder 26a is pivotally attached to the underside of fixed bed portion 17 in the conventional fashion. Piston rod 26b extends rearwardly of the cylinder 26a and is pivotally attached at its outward end to one end of a bracket 28. The opposite end of bracket 28 is pivotally attached to the rear of the underside of the fixed bed portion 17. The forward edge of the foldable bed portion 18 carries a transverse member 29. A second bracket 30 comprising spaced, parallel tabs 31 extends from the center of the transverse member 29 generally perpendicularly thereto. The second cylinder 27a is pivotally attached at the opposite end of the second bracket 30 in the usual fashion and the second piston rod 27b extends from the cylinder 27a to the first bracket 28 to which is also pivotally attached. Thus, it will be seen that operation of the rods 26b, 27b within the cylinders 26a, 27a by application of hydraulic fluid under pressure will operate to move the foldable bed portion 18 from its folded position seen in FIG. 1 to its unfolded position seen in FIG. 6.

Figure 3:
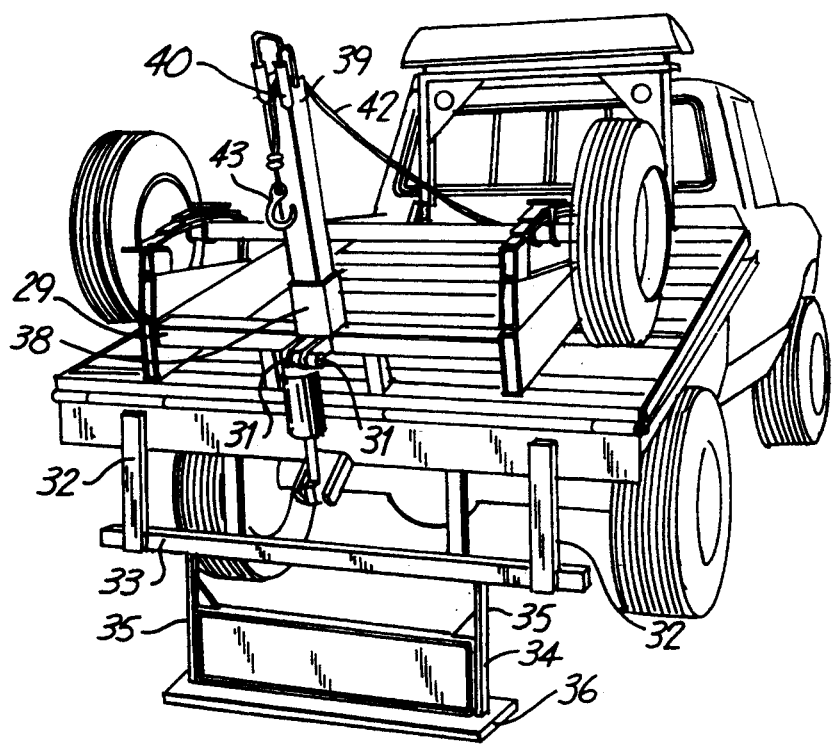
FIG. 3 is a rear perspective view of a retriever/transporter according to the present invention illustrating the bed in the folded position, the stabilizer in its extended position and the detachable boom in place, all in preparation for retrieving a disabled vehicle.

A mechanism for stabilizing the retriever/transporter 10 while retrieving a disabled vehicle is best seen in FIGS. 2, 3 and 4. Referring to FIG. 3, the rear portion of the underside of the fixed bed portion 17 has a pair of spaced, downwardly extending braces 32 extending to a point intermediate the underside of the fixed bed portion 17 and the ground surface. The bottom end of the braces 32 are joined by cross member 33. A stand 34 consisting of spaced, parallel members 35 connected at one end by a transverse foot 36 is pivotally connected to the cross member 33 as shown. A pair of cylinder/piston combinations 37 are connected at one end to the mid portion of the underside of the fixed bed portion 17 at the other end to the foot 36. Operation of the cylinder/piston combinations 37 by application of hydraulic fluid under pressure will serve to swing the stand 34 from its normally retracted position as seen in FIGS. 1 and 4 to its extended position seen in FIGS. 2 and 3. The length of the stand 34 is such that when it is in the extended position, it engages the ground surface and slightly raises the rear of the fixed bed portion 17 to take weight off the tires, thereby stabilizing the retriever/transporter 10 so that it can be utilized to retrieve a disabled vehicle in the manner hereinafter described.

Transverse member 29 also carries a rectangularly shaped collar 38 which projects upwardly when the foldable bed portion 18 is in the folded position. A removable boom 39 having a similarly configured cross section is provided which may be received in and held by collar 38 as best seen in FIG. 3. The top end of the boom 39 carries a roller 40 and a winch 41 is attached to the top side of the fixed bed portion 17 immediately behind the cab 14 and carries a wound cable 42. The cable 42 can be extended from the winch 41 over roller 40 to provide, in conjunction with a hook 43, for a more or less conventional boom arrangement.

Operation

The operation of the retriever/transporter 10 will be described in typical sequence for retrieving and transporting a disabled vehicle.

Upon dispatching of the retriever/transporter 10, the bed 16 is placed in its folded position and the stand 34 in its retracted position, much as seen in FIG. 1. The retriever/transporter 10 is then driven to the location of the disabled vehicle. Upon arrival, if the disabled vehicle has left the roadway or is otherwise inaccessible, the boom 39 is positioned within collar 38 and the cable 42 extended from the winch 41 over roller 40 to the disabled vehicle. The hook 43 is secured to the disabled vehicle at the appropriate place and the stand 34 is rotated to its extended position, as best seen in FIG. 3, to stabilize the retriever/transporter 10. The winch 41 is then operated to draw the disabled vehicle toward the retriever/transporter 10 and on to the road or other surface.

Once the disabled vehicle has been retrieved, the bed 16 of the retriever/transporter 10 is placed in its unfolded position as best seen in FIG. 6. The retriever/transporter 10 is then positioned appropriately with respect to the disabled vehicle and a pair of ramps 20 are provided extending from the rear of the foldable bed portion 18. The cable 42 and hook 43 are thereupon reconnected to the disabled vehicle which is drawn on to the bed 16. Once fully drawn on to the bed 16, the disabled vehicle is transported to the shop or other desired location.

While the preferred embodiment of the present invention has been herein described, it will be apparent to those of ordinary skill in the art that other embodiments are possible within the spirit and scope of my invention.

What is claimed is:

1. A vehicle for retrieving and transporting disabled vehicles, having a frame supported upon a front and rear wheeled axle and a cab enclosing an operator's compartment, comprising:

(a) a fixed bed portion positioned behind said cab, said fixed bed portion being inclined rearwardly and downwardly and terminating at a rear edge;
(b) a foldable bed portion having a front edge hinged to said rear edge of said fixed bed portion and being operable between a folded position wherein said foldable bed portion overlies said fixed bed portion and an unfolded position wherein said foldable bed portion is coplanar with said fixed bed portion;
(c) a bracket having a first end and a second end, said bracket being hinged at said first end to the rear of said fixed bed portion for rotation about said first end;
(d) a first hydraulic cylinder attached to the said foldable bed portion and having a first piston rod extending therefrom, said first piston rod being pivotally attached to said second end of said bracket;
(e) a second hydraulic cylinder attached to said fixed bed portion forwardly of said bracket and having a second piston rod extending therefrom, said second piston rod being pivotally attached to the second end of said bracket; and
(f) means for operating said piston rods within said cylinders.

2. A vehicle for retrieving and transporting disabled vehicles, having a frame supported upon a front and rear wheeled axle and a cab enclosing an operator's compartment, comprising:
(a) a fixed bed portion positioned behind said cab, said fixed bed portion being inclined rearwardly and downwardly and terminating at a rear edge;
(b) a foldable bed portion having a front edge hinged to said rear edge of said fixed bed portion and being operable between a folded position wherein said foldable bed portion overlies said fixed bed portion and an unfolded position wherein said foldable bed portion is coplanar with said fixed bed portion; and
(c) a wheeled axle attached to said foldable bed portion, said axle having a wheel at each end, said wheels being in contact with the ground when said foldable bed portion is in said unfolded position.

3. A vehicle for retrieving and transporting disabled vehicles, having a frame supported upon a front and rear wheeled axle and a cab enclosing an operator's compartment, comprising:
(a) a fixed bed portion positioned behind said cab, said fixed bed portion being inclined rearwardly and downwardly and terminating at a rear edge;
(b) a foldable bed portion having a front edge hinged to said rear edge of said fixed bed portion and being operable between a folded position wherein said foldable bed portion overlies said fixed bed portion and an unfolded position wherein said foldable bed portion is coplanar with said fixed bed portion;
(c) a collar attached to said foldable bed portion; and
(d) a detachable boom positionable within said collar when said foldable bed portion is in said folded position.

4. A vehicle for retrieving and transporting disabled vehicles, having a frame supported upon a front and rear wheeled axle and a cab enclosing an operator's compartment, comprising:
(a) a fixed bed portion positioned behind said cab, said fixed bed portion being inclined rearwardly and downwardly and terminating at a rear edge;
(b) a foldable bed portion having a front edge hinged to said rear edge of said fixed bed portion and being operable between a folded position wherein said foldable bed portion overlies said fixed bed portion and an unfolded position wherein said foldable bed portion is coplanar with said fixed bed portion;
(c) a first bracket having a first end and a second end, said bracket being hinged at said first end to said rear bed portion for rotation about said first end;
(d) a first hydraulic cylinder attached to said foldable bed portion and having a first piston rod extending therefrom, said first piston rod being pivotally attached to said second end of said bracket;
(e) a second hydraulic cylinder attached to said fixed bed portion and having a second piston rod extending therefrom, said second piston rod being pivotally attached to the second end of said bracket;
(f) a wheeled axle attached to said foldable bed portion, said axle having a wheel at each end, said wheels being in contact with the ground when said foldable bed portion is in said unfolded position;
(g) a collar attached to said foldable bed portion and a detachable boom positionable within said collar when said foldable bed portion is in said unfolded position; and
(h) a ground engaging stand hinged at one end to said fixed bed portion, said stand being operable between a retracted position and an extended position.

* * * * *